United States Patent
Gilad et al.

(10) Patent No.: US 12,038,843 B1
(45) Date of Patent: Jul. 16, 2024

(54) JOINT SCHEDULER FOR HIGH BANDWIDTH MULTI-SHOT PREFETCHING

(71) Applicant: Next Silicon Ltd, Givatayim (IL)

(72) Inventors: Yiftach Gilad, Givat Ada (IL); Liron Zur, Haifa (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 18/537,927

(22) Filed: Dec. 13, 2023

(51) Int. Cl.
   *G06F 12/08* (2016.01)
   *G06F 12/0862* (2016.01)
   *G06F 12/0897* (2016.01)

(52) U.S. Cl.
   CPC ...... *G06F 12/0862* (2013.01); *G06F 12/0897* (2013.01); *G06F 2212/602* (2013.01); *G06F 2212/6024* (2013.01)

(58) Field of Classification Search
   CPC ............. G06F 12/0862; G06F 12/0897; G06F 2212/602; G06F 2212/6024
   See application file for complete search history.

(56) References Cited

U.S. PATENT DOCUMENTS

2009/0063779 A1*  3/2009  Koren ................ G06F 12/0855
                                                           711/140

OTHER PUBLICATIONS

Aparicio et al. "Combining Prefetch With Instruction Cache Locking in Multitasking Real-Time Systems", 16th IEEE International Conference on Embedded and Real-Time Computing Systems and Applications, RTCSA 2010, Macau, SAR, China, Aug. 23-25, 2010, p. 319-328, Aug. 23, 2010.

Nesbit et al. "Data Cache Prefetching Using a Global History Buffer", 10th International Symposium on High Performance Computer Architecture, HPCA '04, Madrid, Spain, Feb. 14-18, 2004, p. 96-105, Feb. 14, 2004.

\* cited by examiner

Primary Examiner — Jae U Yu

(57) ABSTRACT

A joint scheduler adapted for dispatching prefetch and demand accesses of data relating to a plurality of instructions loaded in an execution pipeline of processing circuit(s). Each prefetch access comprises checking whether a respective data is cached in a cache entry and each demand access comprises accessing a respective data. The joint scheduler is adapted to, responsive to each hit prefetch access dispatched for a respective data relating to a respective instruction, associate the respective instruction with a valid indication and a pointer to a respective cache entry storing the respective data such that the demand access relating to the respective instruction uses the associated pointer to access the respective data in the cache, and responsive to each missed prefetch access dispatched for a respective data relating to a respective instruction, initiate a read cycle for loading the respective data from next level memory and cache it in the cache.

20 Claims, 7 Drawing Sheets

JOINT SCHEDULER FOR HIGH BANDWIDTH MULTI-SHOT PREFETCHING

FIELD AND BACKGROUND OF THE INVENTION

The present invention, in some embodiments thereof, relates to scheduling memory accesses at processing units, and, more specifically, but not exclusively, to using a joint scheduler for scheduling memory accesses at processing units with increased efficiency, reduced latency and/or increased bandwidth.

In modern computing systems, the performance of processors heavily relies on effective utilization of cache memories.

Caches employing high-speed memory devices may be deployed in close proximity to the processing unit, often within the processor itself, to store frequently accessed data and/or instructions, thus reducing the latency associated with fetching information from the main memory which is significantly slower and imposes long access time.

However, traditional cache management techniques may exhibit inherent limitations in terms of responsiveness and/or adaptability to varying workloads and data access patterns which may directly affect data retrieval performance.

SUMMARY OF THE INVENTION

It is an object of the present invention to provide, methods, systems and software program products for increasing efficiency of processing units' scheduler to reduce latency and increase execution bandwidth. The foregoing and other objects are achieved by the features of the independent claims. Further implementation forms are apparent from the dependent claims, the description and the figures.

According to a first aspect of the present invention there is provided a joint scheduler, comprising a joint scheduler circuit adapted for dispatching prefetch and demand accesses of data relating to a plurality of instructions loaded in an execution pipeline of one or more processing circuits. Each prefetch access comprises checking whether a respective data is cached in one of a plurality of cache entries of one or more caches, and each demand access comprises accessing a respective data. The joint scheduler circuit is adapted to: (1) responsive to each hit prefetch access dispatched for a respective data relating to a respective one of the plurality of instructions, associate the respective instruction with a valid indication and a pointer to a respective cache entry storing the respective data such that the demand access relating to the respective instruction uses the associated pointer to access the respective data in the one or more caches, and (2) responsive to each missed prefetch access dispatched for a respective data relating to a respective one of the plurality of instructions, initiate a read cycle for loading the respective data from next level memory and cache it in the one or more caches.

According to a second aspect of the present invention there is provided a method of jointly scheduling prefetch and demand accesses, comprising using a joint scheduler circuit adapted for dispatching prefetch and demand accesses of data relating to a plurality of instructions loaded in an execution pipeline of one or more processing circuits. Each prefetch access comprises checking whether a respective data is cached in one of a plurality of cache entries of one or more caches, and each demand access comprises accessing a respective data. The joint scheduler circuit is adapted to: (1) responsive to each hit prefetch access dispatched for a respective data relating to a respective one of the plurality of instructions, associate the respective instruction with a valid indication and a pointer to a respective cache entry storing the respective data such that the demand access relating to the respective instruction uses the associated pointer to access the respective data in the one or more caches, and (2) responsive to each missed prefetch access dispatched for a respective data relating to a respective one of the plurality of instructions, initiate a read cycle for loading the respective data from next level memory and cache it in the one or more caches.

According to a third aspect of the present invention there is provided a joint scheduler, comprising a joint scheduler circuit adapted for enhancing out-of-order execution of a plurality of instructions loaded in an execution pipeline of one or more processing circuits by tracking invalidation and/or eviction of data stored in each of a plurality of cache entries of one or more caches storing data relating to the plurality of instructions, and dispatching a prefetch cycle to load the invalidated and/or evicted data relating to one or more of the plurality of instructions thus making the respective data available in the one or more caches during a demand access dispatched for the one or more instructions.

In a further implementation form of the first, second and/or third aspects, the joint scheduler circuit is adapted to, responsive to successful completion of a respective read cycle initiated for loading a respective data from the next level memory and caching it in the one or more caches following a respective missed prefetch access, associate the respective instruction with the valid indication and the pointer to the respective cache entry storing the cached respective data.

In a further implementation form of the first, second and/or third aspects, the joint scheduler circuit is adapted to, responsive to successful completion of a respective read cycle initiated for loading a respective data from the next level memory and caching it in the one or more caches following a respective missed prefetch access, dispatch another prefetch access to update the valid indication and the pointer to the respective cache entry storing the cached respective data.

In an optional implementation form of the first, second and/or third aspects, the joint scheduler circuit is further adapted to track invalidation and/or eviction of data stored in each of the plurality of cache entries and, responsive to eviction of a respective cache entry storing a respective data relating to a respective one of the plurality of instructions, associate the respective instruction with an invalid indication and initiate another prefetch cycle to load the respective data from the next level memory into the one or more caches.

In an optional implementation form of the first, second and/or third aspects, the joint scheduler circuit is further adapted to mark a respective cache entry with an active indication for each prefetch access hit, the active indication indicates that the respective cache entry is mapped by a pointer associated with one or more of the instructions, the active indication is used by the joint scheduler circuit for tracking invalidation and/or eviction of data stored in the respective cache entry.

In a further implementation form of the first, second and/or third aspects, the joint scheduler circuit is adapted to, for each prefetch access miss, associate the respective instruction with a block mark indicating that each prefetch access and/or demand access relating to the respective instruction is blocked for dispatch.

In a further implementation form of the first, second and/or third aspects, the joint scheduler circuit is adapted to, responsive to successful completion of the prefetch cycle, remove the block mark associated with the respective instruction.

In a further implementation form of the first, second and/or third aspects, the joint scheduler circuit comprises one or more prefetch ports for dispatching the prefetch accesses and one or more demand ports for dispatching the demand accesses. The one or more prefetch ports are separate and independent of the one or more demand ports.

In a further implementation form of the first, second and/or third aspects, one or more prefetch accesses and one or more demand accesses are dispatched simultaneously via the independent one or more prefetch ports and the one or more demand ports respectively.

In a further implementation form of the first, second and/or third aspects, for one or more simultaneously dispatched prefetch accesses and one or more demand accesses relating to a common cache entry, responsive to completion of the one or more prefetch accesses, a pointer to the common cache entry is updated for the one or more demand accesses directly in the one or more demand ports.

In a further implementation form of the first, second and/or third aspects, the joint scheduler circuit is adapted to dispatch the prefetch cycle responsive to eviction and/or invalidation of one or more cache entries storing respective data relating to a respective one of the plurality of instructions by initiating the prefetch cycle to load the respective data from a next level memory into the one or more caches, and associating the respective instruction with a valid indication and a pointer to a respective cache entry storing the respective data such that the demand access relating to the respective instruction uses the associated pointer to access the respective data in the one or more caches.

In an optional implementation form of the first, second and/or third aspects, the joint scheduler circuit is further adapted to associate the respective instruction with the valid indication and the pointer by initiating another prefetch cycle for the respective instruction. Wherein the joint scheduler circuit is adapted to associate the respective instruction with the valid indication and the pointer responsive to a hit of the another prefetch cycle.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
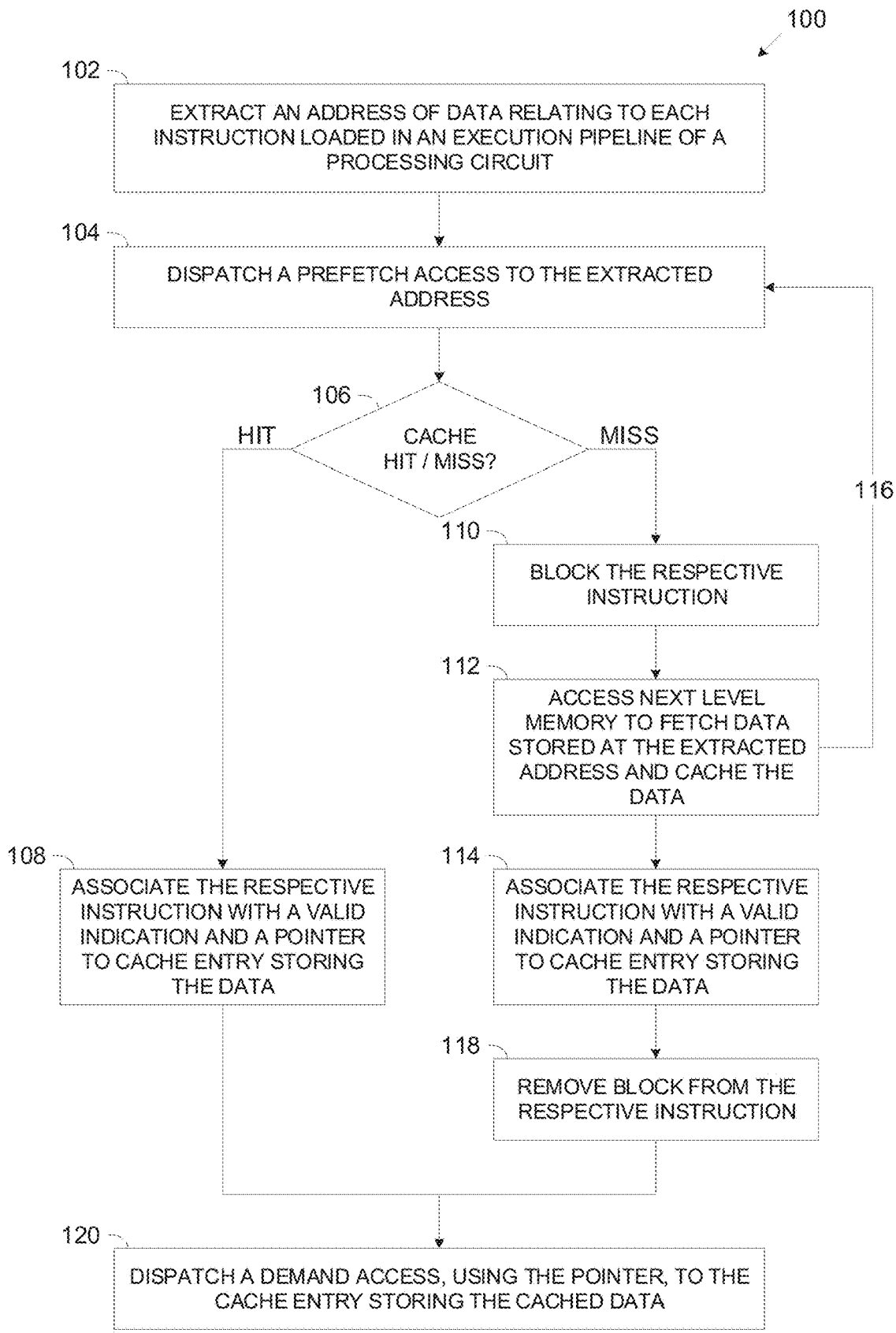
FIG. 1 is a flowchart of an exemplary process of using a joint scheduler of a processing unit configured for efficiently scheduling memory accesses, according to some embodiments of the present invention.

The present invention, in some embodiments thereof, relates to scheduling memory accesses at processing units, and, more specifically, but not exclusively, to using a joint scheduler for scheduling memory accesses at processing units with increased efficiency, reduced latency and/or increased bandwidth.

According to some embodiments of the present invention, there are provided apparatuses, methods and computer program products for improving memory accesses dispatched by a processing unit by jointly scheduling prefetch and demand accesses.

Memory latency and access bandwidth are key elements in overall performance of a processing unit. In order to decrease latency and memory access bandwidth, caches are used to hold segments of the memory image.

The caches which are utilized using high-speed memory arrays are typically deployed in close proximity and short distance to the critical drivers (write operations) or receivers (read operations) of the processing unit, often within the processing unit itself (L1 cache) thus supporting fast access. However, while high-speed, the caches may have limited capacity which may limit them to store relatively small segments of the memory image.

Performance of the memory access therefore dependents on a hit rate of the cache lookups. Cache lookup refers to searching for a match between the address of the memory access (read or write operation) and one of the addresses of data stored in the cache, i.e., address cache typically comprising tag and index fields. A cache hit means the address of the accessed data is found in the address cache and the accessed data is therefore cached and stored in the cache.

In case of a miss, in which the data portion of the memory image which is required by read or write operations is not cached, the required data portion must be fetched from a next level memory, for example, the main memory or at least from a next higher hierarchy memory, for example, an L2 cache, an L3 cache and/or the like. This may increase the latency of the operation as well as hurt the cache bandwidth due to the longer access time imposed by the next level memory and also since accesses may be performed more than once (the additional accesses conflict with other cache accesses).

Since the cache capacity is limited, once a new memory line (the minimal memory portion which is cached in the cache) is loaded into the cache, an old memory line must be evicted from the cache in order to make room for the new memory line. This operation is called replacement since the new memory line replaces the old one. Once a memory line which was evicted is being accessed again, it must be reloaded into the cache from the higher memory hierarchies.

In order to increase cache's hit rate, prefetching may be applied, meaning that a prefetch cycle may be initiated (dispatched) in advance to load data required by one or more instructions into the cache before a "real" demand access is dispatched during execution of the respective instruction. As such, once the real demand access is dispatched, during execution of the instruction, it finds the required data already loaded and cached in the cache. In particular, as described herein before, during a prefetch access a complete memory line comprising the required data is loaded into the cache (cached).

One of the popular prefetching algorithms is early cache lookups, also designated prefetch access herein after, which is a technique designed to overcome blocking situations in which instructions may be blocked and their demand accesses (read or write operations) may not be dispatched until one or more conditions are met even if the access address is already known.

Such situations may include, for example, instruction fetch operations dispatched to read data from an instruction cache which are typically done in-order, such that each fetch must wait until previous fetches are completed before reading its data from the instruction cache. In case a certain instruction fetch operation is delayed (e.g., due to a cache miss), following instruction fetch operations must be delayed until completion of the delayed fetch operation even if their memory address is known. In another example, data store operations dispatched to write data to a data cache are non-recoverable operations since the old data is overridden by new data and therefore cannot be restored. A data store operation may be therefore performed only after all previous instructions are committed even if its memory address is known.

Since the memory address of the demand access (read or wrote operation) is known, even though the real demand can't be performed due to blocking condition(s), corresponding prefetch access may be dispatched in advance to the same address to perform an early lookup in the cache. A such, the prefetch access may check whether the memory line comprising the data relating to the instruction exists in the cache (cached) without performing the actual demand access (read or write operations). In case of cache hit, meaning the requested data is cached no further may be taken. However, in case of cache miss, an early read operation may be dispatched to load the memory line from a higher memory level and caching it in the cache thus reducing the latency of the real demand once it is dispatched.

While modern processing units may be capable of executing multiple instructions in parallel, obviously since only a limited number of memory and cache accesses may be dispatched in a given cycle, schedulers are implemented to determine which instruction(s) should be dispatched in each cycle and schedule the instructions accordingly.

A scheduler may typically comprise ready logic and a scheduling module. The ready logic is configured to calculate which instruction is eligible to be dispatched. An instruction (entry in the scheduler) is ready for dispatch if it is allocated, not in progress in the dispatch pipe, eligible to be dispatched (e.g., oldest fetch) and not blocked. An instruction may be blocked, for example, if its previous dispatch revealed a problem. The blocking will be removed (wake up) only after the blocking source (reason) is resolved. For example, a cache miss will block dispatches of a given entry until the required memory line is loaded from the next level memory and cached in the cache.

The scheduling module which may comprise one or more dispatch ports may dispatch one or more accesses of instruction entries which are ready. The scheduling module may employ one or more scheduling mechanisms, for example, age based scheduling (select oldest entry first), location based scheduling (select the first ready entry in the scheduler), and/or the like. Each scheduled instruction is dispatched, performs cache lookup and updates the scheduler at the end of the lookup pipe according to its completion, for example, success when the instruction is deallocated from the scheduler, failure in case of a blocking condition, and/or the like.

According to some embodiments of the present invention, there are provided apparatuses, methods and computer program products for improving memory accesses dispatched by a processing unit by jointly scheduling prefetch and demand accesses.

In particular, a joint scheduler of a processing unit may be adapted to schedule memory accesses units by dispatching prefetch accesses and data demand accesses dispatched or the same instructions in correlation with each other rather than dispatching prefetch accesses and data demand accesses separately and independently of each other as may be done by existing schedulers.

The joint scheduler may dispatch a prefetch access to lookup the cache for data relating to a respective instruction loaded in the execution pipeline of the processing unit. In case of a cache hit, when the requested data is found in the cache, i.e., the data is stored (cached) in one of the cache entries of the cache, the joint scheduler may associate the respective instruction with a valid indication (e.g., flag) and a pointer to the cache entry storing the data.

Otherwise, in case of a cache miss, when the requested data is not found in the cache, a read cycle may be initiated to fetch the data from the next level memory and load it into the cache. Following a successful completion of the read cycle, the joint scheduler may then associate the respective instruction with a valid indication and a pointer to the cache entry storing the data as done in the cache hit. Alternatively, following the successful completion of the read cycle, the joint scheduler may dispatch another prefetch access which will also result in a cache hit which will lead to associating the respective instruction with a valid indication and a pointer to the cache entry storing the data.

When the respective instruction is executed, the joint scheduler may identify the valid indication associated with the respective instruction and may dispatch the demand access of the respective instruction using the pointer associated with the respective instruction to directly access the cache entry mapped by the associated pointer thus eliminating the need for the demand access to search the address cache (tag/index).

The joint scheduler may further monitor all of the cache entries pointed by pointers associated with instructions in order to detect invalidation and/or eviction (removal) of the cache lines stored in these cache entries. In case a cache entry mapped by a pointer associated with a respective instruction is invalidated and/or evicted, the joint scheduler may remove the valid indication associated with the respective instruction to indicate that the data relating to the respective instruction is no longer cached, i.e., not stored in the cache.

Moreover, responsive to invalidation and/or eviction, the joint scheduler may dispatch another prefetch access to reload the previously invalidated and/or evicted data and make it available again to a subsequent demand access of the respective instruction. Since during the another prefetch access, the respective instruction may be associated again with a valid indication and a pointer mapping the cache entry storing the reloaded data. The demand access of the respective instruction, dispatched by the joint scheduler, may thus use the pointer associated with the respective instruction to directly access reloaded data stored in the cache entry mapped by the associated pointer.

Using the joint scheduler to dispatch prefetch and demand accesses correlated with each other may present major benefits and advantages over currently existing schedulers.

First, searching (lookup) the address cache (tag/index fields) of the cache to compare with the address of data relating to a respective instruction (lookup) may be done only once during a prefetch access dispatched for each instruction scheduled for execution, this is because the demand access dispatched for a respective instruction may directly access the cache entry mapped by the pointer associated with the respective instruction thus eliminating the need for another lookup through the tag/index fields of the cache. This may significantly reduce memory and cache access latency and/or increase access bandwidth.

Moreover, the single lookup is conducted while the respective instruction is still waiting for execution while the demand access of the respective instruction which is dispatched during execution of the respective instruction may not require a lookup. This may significantly expedite instructions execution thus significantly increasing execution performance of the processing unit in terms of time, speed, and/or the like.

Some existing schedulers may apply locked prefetch in which in case the early prefetch (lookup) results in a cache hit, the hit cache line is locked such that it is not allowed to be invalidated and/or evicted (replaced), and a pointer to the relevant cache entry is kept in the scheduler for the use by the real demand access.

While this solution may increase access bandwidth due to elimination of the second lookup by the demand access, this mechanism may be present major limitations. First, in case all potentially used cache entries of the cache are locked, additional memory accesses requesting loading additional data, which not currently cached, cannot be served. Some schedulers may employ a dedicated mechanism to release locks in order to enable progress. However, such lock release mechanisms may be highly complex, require extensive hardware resources (e.g., logic circuits, memory cells, etc.), and/or degrade memory access performance. Moreover, locking cache entries may harm performance since it effectively reduces the cache size and new data loaded to the cache must replace another entry which may have higher priority thus reducing the cache hit rate.

The joint scheduler on the other hand does not lock cache entries which may prevent cache blocking for further data and may therefore not degrade memory access latency and/or bandwidth which may prevent degradation of execution performance. Rather, the joint scheduler monitors the cache entries mapped by the pointers associated with the instructions scheduled for execution to track invalidation and/or eviction, and in case of invalidation and/or eviction may reload the data relating to the instructions.

Other existing schedulers may utilize a dedicated prefetch buffer such that in parallel to allocating instructions to the being written to the scheduler, the instructions may be also written to a prefetch buffer. The prefetch buffer may be adapted to initiate prefetch access that will search (lookup) the addresses of data cached in the cache, while the scheduler may only issue real demand accesses which may search (lookup) the cache as if no prefetch was done, in addition to accessing the dedicated prefetch buffer. A prefetch accesses may be issued to send an outstanding request upon cache miss only in case of the data requested by a demand access is not found in the prefetch buffer. Prefetch accesses may not be updated at the scheduler.

This mechanism also presents some major disadvantages and limitations. First, the prefetch accesses (lookup) bandwidth may be significantly poor since potentially each data request is dispatched twice, once during prefetch access and again during demand access. Moreover, the prefetch buffer is merely a duplicated copy of the scheduler, and may therefore consume additional hardware resources or alternatively have reduce size which may obviously limit prefetch capacity and/or cause drop of prefetch accesses. Furthermore, unlike the scheduler, the prefetch buffer may not support aged based scheduling. Also, prefetch accesses may be dispatched only once and in case a cache line is evicted after a prefetch access was made to this cache line, no additional prefetch may be dispatched until the real demand access. The demand access therefore has to perform cache lookup again and possibly need to access the next level memory which may further reduce memory bandwidth and/or increase access latency.

In contrast, using the joint scheduler requires only a single lookup conducted during a prefetch access relating to a respective instruction before the respective instruction is executed while the demand access, dispatched when the respective instruction is executed, may use the pointer associated with the respective instruction to directly access the mapped cache entry without performing a lookup. Conducting the lookup only once may significantly reduce demand access latency and/or increase access bandwidth.

Moreover, the joint scheduler does not employ a dedicated buffer and may therefore not increase consumption of hardware resources on one hand and may have increased size on the other hand which may further reduce memory access latency and/or increase memory access bandwidth. Furthermore, the joint scheduler may employ multiple scheduling algorithms and/or techniques, including aged based scheduling as well as other scheduling algorithms such as, for example, location based scheduling, and/or the like.

Furthermore, the joint scheduler may significantly increase out-of-order execution performance of the processing unit. Since it continuously monitors the cache entries to track and identify invalidation and/or eviction events, the joint scheduler may reload previously invalidated and/or evicted data relating to instructions in the execution pipeline irrespective of their order. Therefore, even if data relating to instruction(s) located further down the pipeline is evicted, this data is rapidly and automatically made available again, thus enabling early execution of the further down instruction(s) thus significantly increasing out-of-order execution which, as known in the art, may significantly increase execution performance of the processing unit.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to the drawings, FIG. 1 is a flowchart of an exemplary process of using a joint scheduler of a processing unit configured for efficiently scheduling memory accesses, according to some embodiments of the present invention.

An exemplary process 100 may be executed by a joint scheduler of each of one or more processing units to schedule memory accesses to efficiently schedule memory accesses in processing units having one or more cache memory units by dispatching prefetch accesses and data demand accesses dispatched or the same instructions in correlation with each other thus increasing performance of data loading and/or data caching, for example, reducing latency, increasing bandwidth, reducing lock time, and/or the like.

Instructions loaded in an execution pipeline of a processing unit may access, for example, read, and/or write data stored in memory accessible by the processing unit.

As known in the art, in order to increase performance and reduce latency, the processing unit may be equipped with one or more high-speed low latency cache memory, for example, L1 cache, L2 cache, and/or the like for caching data stored in memory of the processing unit. However, while supporting high-speed accesses, the cache(s) may be limited in capacity and may therefore store only a limited amount of data at any given time.

In order to further increase data access performance, since data relating to a certain instruction may not cached (loaded in cache), rather than loading this data when the respective instruction is executed, a prefetch access may be initiated in advance, ahead of time, for loading this data into cache (caching) before these instructions are executed thus significantly reducing access time and thus execution time of the instruction.

Figure 2A:
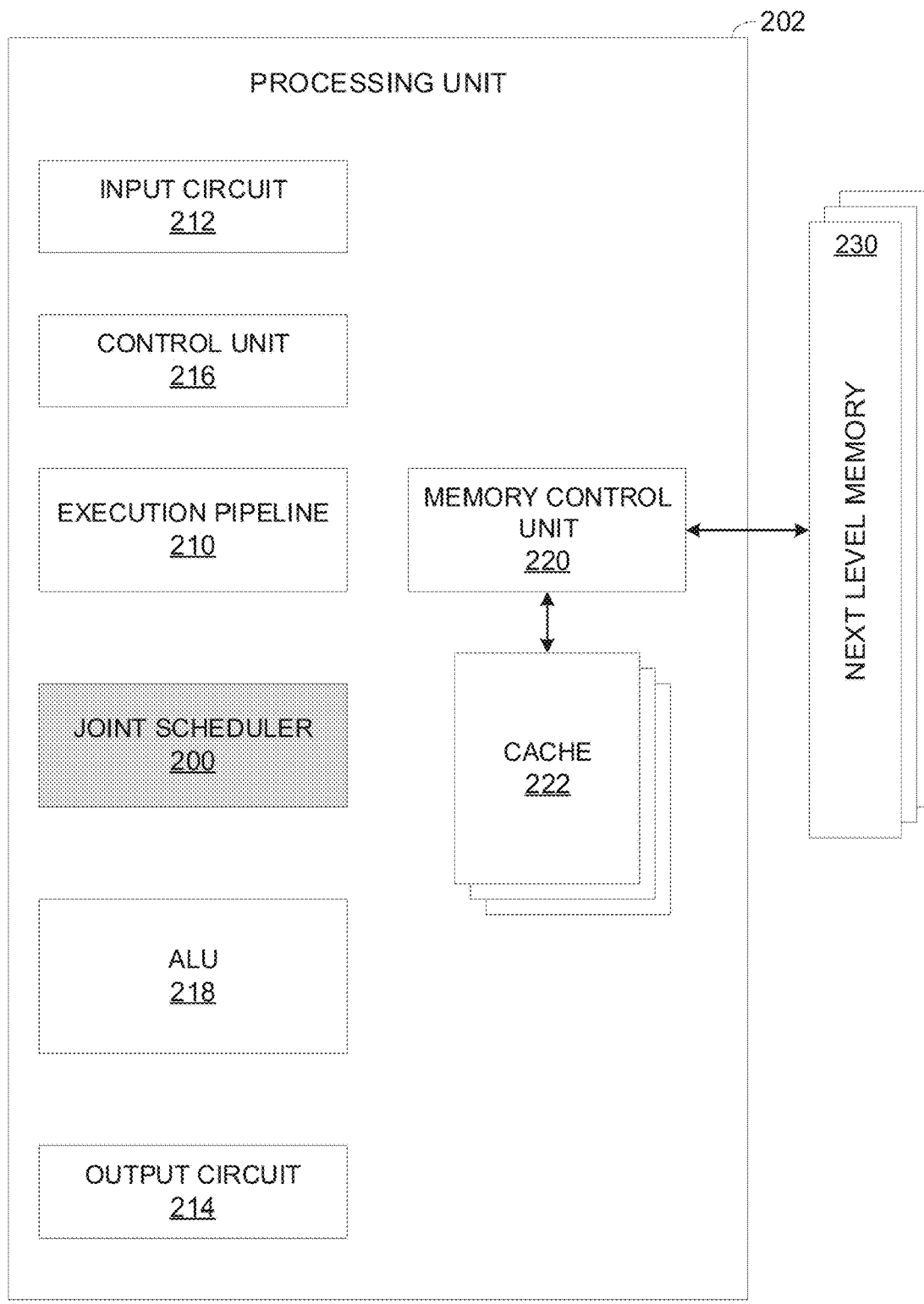
FIG. 2A and FIG. 2B are schematic illustrations of an exemplary joint scheduler of a processing unit configured for efficiently scheduling memory accesses, according to some embodiments of the present invention.
Figure 2B:
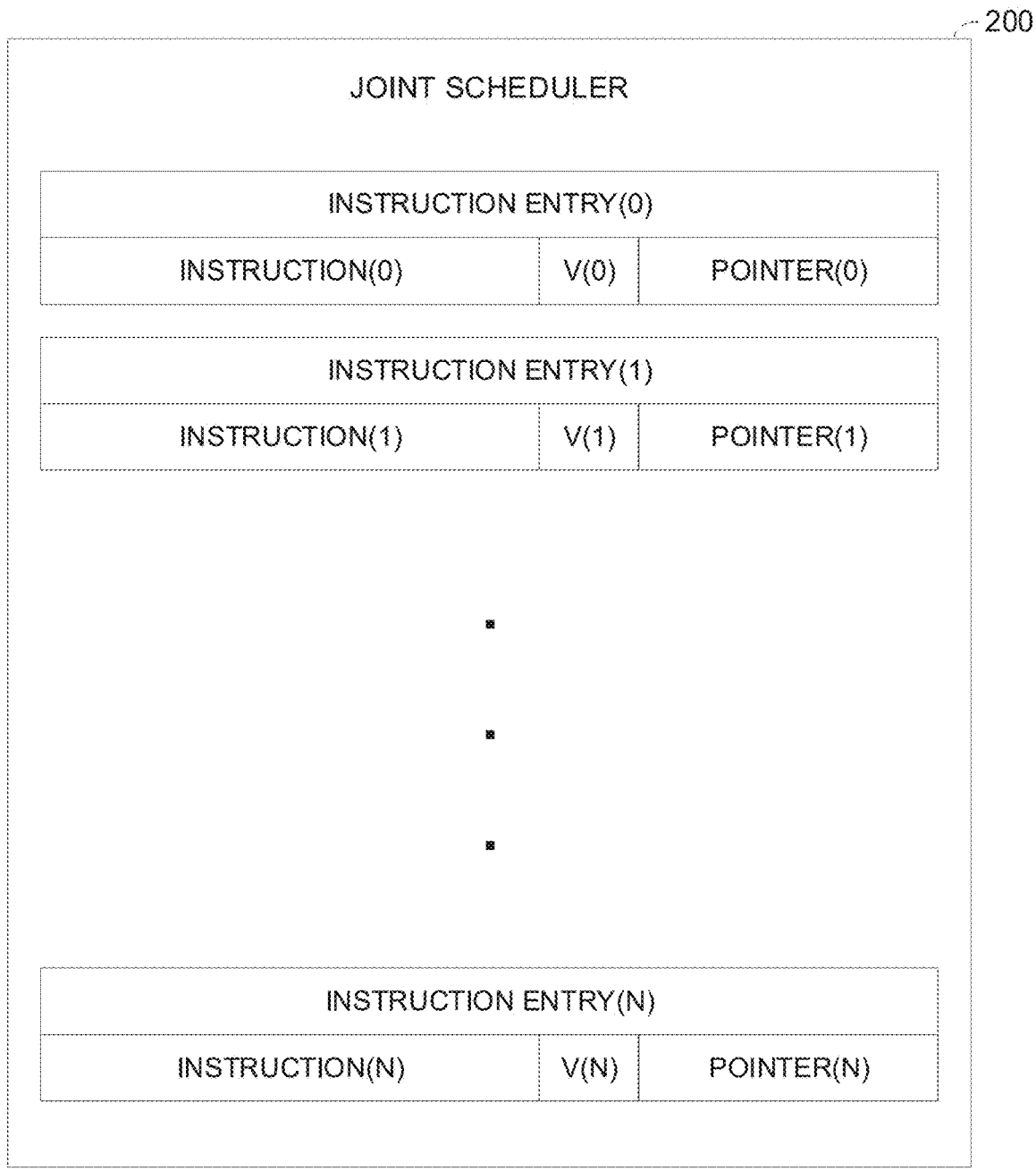

Reference is also made to FIG. 2A and FIG. 2B. which are schematic illustrations of an exemplary joint scheduler of a processing unit configured for efficiently scheduling memory accesses, according to some embodiments of the present invention.

As seen in FIG. 2A, an exemplary joint scheduler 200, interchangeably designated dual dispatch scheduler, of an exemplary processing unit (processor) 202 may comprise one or more joint scheduler circuits configured and/or adapted to dispatch both prefetch accesses and demand accesses for accessing data relating to one or more instructions loaded in an execution pipeline 210 of the processing unit 202, for example, data read, data write, and/or the like.

The processing unit 202 may include one or more units, circuits, modules, and/or the like as known in the art. For example, the processing unit 202 may include an input circuit 212 and an output circuit 214 for receiving and outputting data.

The processing unit 202 may further include a control unit 216 for controlling operations and/or activities of the processing units 202 and one or more Arithmetic Logic Units (ALU) 218, for performing mathematical, arithmetic and/or logical operations, such as, for example, addition, subtraction, multiplication, and division, shift, and, or, not, and/or the like and may further execute instructions involving mathematical calculations. The ALU(s) 218 may be adapted to operate according to one or more numeric formats, for example, integer, floating-point, fixed-point, and/or the like.

The processing unit 202 may include a memory control unit 220 for controlling, managing, and/or handling accesses to memory, for example, load, read, write, and/or the like of data and/or instructions, i.e., program instructions. The memory controller 220 may be adapted to control one or more memory channels and may include one or more memory control modules as known in the art, for example, an Memory Management Unit (MMU), and/or the like.

Moreover, the processing unit 202 may include one or more caches 222, for example, an L1 cache comprising one or more high-speed, low-latency devices for storing (caching) data and/or instructions loaded from a next level memory 230 and thus accessible to the processing unit 202 with low latency. While extremely fast, the cache(s) 222 may be limited in their capacity thus allowing storage of only limited segments of data and/or instructions.

The next level memory 230 which may be also controlled by the memory control unit 220 may comprise, for example, one or more next level cache units, for example, L2 cache, L3 cache, and/or the like which are typically slower than the cache(s) 222 but may have larger capacity. In another example, the next level memory 230 may comprise one or more standard memory lower speed memory arrays, for example, a system memory, an application memory, and/or the like which may be utilized by one or more volatile memory devices (e.g., RAM), and/or non-volatile memory devices (e.g., Flash, etc.).

It should be noted that processing unit 202 is illustrated in exemplary form only. As such, the processing unit 202 may comprise one or more additional units, circuits, modules, and/or the like which are not illustrated, and/or lack one or more elements which are illustrated for the processing unit 202, as known in the art.

The processing unit 202 may employ one or more processor architectures, structures and/or instructions sets and/or the like supporting one or more bit width, for example, 32-bit, 56-bit, 64-bit, and/or the like. For example, the processing unit 202 may optionally have a von Neumann architecture, for example, a Central Processing Unit (CPU), a multi-core CPU, a Data Processing Unit (DPU), a Microcontroller Unit (MCU) an Accelerated Processing Unit (ACU) and/or the like. In another example, processing unit 202 may optionally have a non-von Neumann architecture, for example, a Graphical Processing Unit (GPU), a DPU, a Field-Programmable Gate Array (FPGA), a Coarse-Grained Reconfigurable Architecture (CGRA), a neural-network accelerator, an Intelligence Processing Unit (IPU), an Application-Specific Integrated Circuit (ASIC), a quantum computer, an interconnected computing grid and/or the like.

The processing unit 202 may be implemented, structured and/or deployed according to one or more designs, structures, and/or implementations. For example, the processing unit 202 may be implemented as a stand-alone apparatus, system, device and/or the like. In another example, the processing unit 202 may be integrated in one or more higher level integrated devices. For example, the processing unit 202 may be implemented as an Integrated Circuit (IC), ASIC, FPGA, and/or the like in one or more devices, for example, a computer, a server, a computing device, and/or the like comprising additional elements. In another example, the processing unit 202 may be integrated in one or more higher level integrated circuits. For example, the processing unit 202 may be implemented as a functional module (e.g., IP core, etc.) embedded in one or more integrated components (e.g., IC, ASIC, FPGA, CPU, GPU, etc.) comprising one or more additional functional elements of the integrated component.

As seen in FIG. 2B, the exemplary joint scheduler 200 may be adapted to dispatch a plurality of prefetch accesses and data demand accesses, interchangeably designated demand accesses, for accessing data relating to a plurality of instructions loaded in the execution pipeline 210 of the processing unit 202.

The joint scheduler 200 may therefore comprise a plurality of instruction entries, each holding a relevant control payload for each instruction loaded in the execution pipeline 210 since its allocation and until it is deallocated (completed). This control payload is used to determine which one of the operations is scheduled.

Each of the instruction entries may further associate each of the instructions loaded in the execution pipeline with a respective valid indication and a pointer field comprising a pointer to a respective cache entry.

a scheduler entry holds the relevant control payload for each operation since its allocation and until it is deallocated (completed). This control payload is used to determine which one of the operations is scheduled.

The valid indication associated with each instruction in a respective instruction entry of the joint scheduler 200 is indicative that the data relating the respective instruction is cached (loaded) in the cache 222, and the pointer field associated with the respective instruction points to the cache entry in the cache 222 which stores the data relating the respective instruction.

The valid indication may be utilized using one or more methods, techniques, and/or implementations. For example, each instruction entry may be associated, correlated, and/or assigned one or more respective bits (i.e., flag) which when set or cleared indicates that the data relating to the instruction of the respective instruction entry is cached in the cache 222. In another example, the valid indication may be implemented via the pointer field. For example, a pointer field comprising a valid pointer to a valid cache entry is indicative that data relating to the respective instruction is cached in the cache 222 while a value, pattern, and/or the like (e.g., 0xFFFFFFFF) which constitutes an invalid pointer which does not point to a valid cache entry may be indicative that data relating to the respective instruction is not cached in the cache 222.

For example, a first instruction entry (0) may associate a first instruction(0) with a respective valid indication V(0) indicating that data relating to instruction(0) is cached in the cache 222 in a cache entry pointed by pointer(0) also associated with instruction(0). In another example, a second instruction entry (1) may associate a second instruction(1) with a respective valid indication V(1) indicating that data relating to instruction(1) is cached in the cache 222 in a cache entry pointed by pointer(1) also associated with instruction(1). This may repeat to an $N^{th}$ instruction entry (N) associating an $N^{th}$ instruction(N) with a respective valid indication V(N) indicating that data relating to instruction (N) is cached in the cache 222 in a cache entry pointed by pointer(N) also associated with instruction(N).

As known in the art, a prefetch access is an access (cycle) initiated to load from memory data relating to an instruction scheduled for execution by the processing unit 202 by accessing the address mapping the requested data in the memory. During the prefetch access a lookup may be first conducted to search for the address of the requested data in the cache 222. In particular, the prefetch access is initiated ahead of execution of the instruction to first check whether the requested data is loaded in one or more caches 222 of the processing unit 202 and in case of a miss, meaning the requested data is not loaded in cache 222, load the data from a next level memory into the cache 222, i.e., cache the data.

A demand access is an access (cycle) initiated to load from memory data relating to an instruction that is currently being executed by the processing unit 202. Since the demand access is typically preceded by a corresponding prefetch access for loading the same data from the same address, the requested data may be typically cached, i.e., stored in the cache 222.

The joint scheduler 200 may comprise one or more prefetch ports for dispatching prefetch accesses and one or more demand ports for dispatching demand accesses which are separate and independent of each other. As such, the joint scheduler 200 may simultaneously dispatch prefetch access and demand accesses, typically relating to different instructions loaded in the execution pipeline 210. Moreover, assuming it comprises multiple prefetch ports, the joint scheduler 200 may simultaneously dispatch a plurality of prefetch accesses relating to multiple different instructions. Similarly, assuming it comprises multiple demand ports, the joint scheduler 200 may simultaneously dispatch a plurality of demand accesses relating to multiple different instructions.

For brevity, the joint scheduler 200 is described in the process 100 to dispatch a single prefetch access and a single demand access which both relating to a single instruction loaded in the execution pipeline 210. This, however, would not be construed as limiting since the joint scheduler 200 may repeat, expand, and/or scale the process 100 to dispatch multiple prefetch accesses and multiple demand accesses relating to multiple instructions loaded in the execution pipeline 210. Moreover, as described herein before, the joint scheduler 200 may comprise multiple prefetch ports and/or multiple demand ports and may therefore simultaneously dispatch a plurality of prefetch and/or demand accesses.

Also for brevity, while the processing unit 202 may comprise multiple caches 222, the process 100 is described for a single cache 222. This, however, would not be construed as limiting since the same methodology applied by the joint scheduler 200 may similarly apply and serve for multiple caches 222 which are controlled by a memory control unit 220 typically transparently to the joint scheduler 200.

As shown at 102, the process 100 starts with the joint scheduler 200 traversing one or more instructions loaded in an execution pipeline 210 of a processing unit 202 and scheduled for execution by the processing unit 202 and extracting an address of data relating to one or more of the loaded instructions.

As shown at 104, the joint scheduler 200 may dispatch a prefetch access to a respective address of a respective data relating to a respective instruction loaded in the execution pipeline 210.

As shown in 106, in case of a hit, meaning that the respective data is cached, i.e., loaded and stored in the cache 222, the process 100 may branch to 108. However, in case of a miss, meaning that the respective data is not cached in the cache 222, the process 100 may branch to 110.

As shown at 108, responsive to a hit prefetch access dispatched for the respective data, the joint scheduler 200 may associate the respective instruction with a valid indication and a pointer to a respective cache entry in the cache 222 which stores the respective data.

As shown at 110-118, responsive to a missed prefetch access dispatched for the respective data, the joint scheduler 200 may initiate a read cycle for loading the respective data from next level memory and cache it in the cache 222.

As shown at 110, before loading the respective data from next level memory and caching it in the cache 222, the joint scheduler 200 may prevent further accesses, whether prefetch accesses and/or demand access relating to the respective instruction until the respective data is cached and available in the cache 222.

To this end, the joint scheduler 200 may associate the respective instruction with a block mark indicating that the respective data relating to the respective instruction is currently being cached and each prefetch access and/or demand access relating to the respective instruction is blocked for dispatch until the respective data is fetched from the next level memory.

As shown at 112, the joint scheduler 200 may initiate a read cycle to the next level memory to fetch the respective data and store (cache) it in the cache 222.

As shown at 114, responsive to successful completion of the read cycle initiated for loading the respective data from the next level memory and caching it in the cache 222, the joint scheduler 200 may associate the respective instruction with a valid indication and a pointer to the respective cache entry of the cache 222 storing the cached respective data. This operation is similar to the operation of step 108 executed by the joint scheduler 200 responsive to a hit prefetch access.

Alternatively, as shown at 116, rather than immediately associating the respective instruction with the valid indication and the pointer to the cache entry storing the cached respective data, the joint scheduler 200 may branch back to 104 to dispatch (initiate) another prefetch access to the respective address of the respective data. Since the respective data is now cached in the cache 222, the another prefetch access will result in a hit at 106 and branch to 108 where the joint scheduler 200 may associate the respective instruction with a valid indication and a pointer to the respective cache entry of the cache 222 storing the cached respective data.

As shown at 118, responsive to successful completion of the prefetch cycle, the joint scheduler 220 may remove the block mark associated with the respective instruction thus allowing dispatching one or more other accesses, typically demand accesses relating to the respective instruction for which the respective data was loaded and cached in the cache 222.

As shown at 120, the joint scheduler 220 may dispatch a demand access relating to the respective instruction.

In particular, the joint scheduler 220 may check the valid indication associated with the respective instruction and determine accordingly whether the respective data relating to the respective instruction is cached in the cache 222. Responsive to determination that the respective data is cached, the joint scheduler 220 may dispatch the demand access using the pointer associated with the respective instruction to access the respective data in the pointed cache entry in the cache 222, for example, read, write, update, and/or the like.

This means that demand accesses may be executed without an additional lookup initiated to check whether the respective data is cached, for example, by traversing the address cache, i.e., tag/index fields of the cache 222 as may be done by existing methods.

Directly accessing the cache entry mapped by the pointer during demand accesses and eliminating the need for the additional lookup may significantly reduce latency for accessing the data relating to the currently executed instruction thus significantly increasing performance of the processing unit 202. Moreover, using the pointer for accessing the respective data in demand accesses may also significantly increase bandwidth of data accesses since the saved time may be used to dispatch and execute significantly more prefetch and/or demand accesses thus further increasing performance of the processing unit 202.

Optionally, in case one or more prefetch accesses and one or more demand accesses relating to a common cache entry are simultaneously dispatched via respective prefetch and demand ports, responsive to completion of the prefetch access, the joint scheduler 200 may update a pointer to the common cache entry for one or more of the demand access(s) directly in the demand port(s).

This means that rather than blocking the demand access(es) until the respective data is cached while a corresponding prefetch access is in progress, the joint scheduler 200 may dispatch the demand access(es) and update their associated pointer after the prefetch access is complete while the demand access(es) are already in the pipe and await their turn for dispatch.

Specifically, the joint scheduler 200 may identify the cache entry in which the data is cached by the simultaneous prefetch access and directly update the pointer associated with the corresponding demand access(es) to map the cache entry caching the data fetched by the simultaneous prefetch access thus bypassing the standard mechanism employed for non-simultaneous accesses.

Optionally, the joint scheduler 200 may be adapted to track invalidation and/or eviction of data stored in each of the plurality of cache entries of the cache 222 and update the valid indication associated with the respective instruction accordingly. This means that the joint scheduler 200 may monitor each cache entry mapped (pointed) by the pointer associated with each instruction in the pipeline 210, which is further associated with a valid indication, to detect invalidation and/or eviction of the data cached in the cache entry.

Responsive to eviction of a respective cache entry storing a respective data relating to a respective one of the instructions loaded in the execution pipeline 210, the joint scheduler 220 may associate the respective instruction with an invalid indication indicative that respective data relating to the respective instructions is no longer cached in the cache 222.

The joint scheduler 200 may further initiate another prefetch cycle to load the respective data from the next level memory into the cache 222. Following the another prefetch access which will miss, steps 110 to 118 may be repeated and the valid indication and pointer associated with the instruction will be updated again to indicate the respective data is cached at a cache entry pointed by the associated pointer.

Optionally, the joint scheduler 220 may be adapted to mark a respective cache entry with an active indication following each prefetch access hit. The active indication indicating that the respective cache entry is mapped by a pointer associated with one or more of the instructions loaded in the execution pipeline 210 may be used by the joint scheduler circuit 220 for tracking (snooping) invalidation and/or eviction of data stored in cache entries marked with the active indication.

By tracking invalidation and/or eviction of the data stored in the cache 222, the joint scheduler 220 may significantly enhance out-of-order execution of one or more of the instructions loaded in the pipeline 210.

The joint scheduler 220 achieves this by executing steps 110-118 of the process 100 responsive to detecting an invalidation and/or eviction to dispatch another prefetch cycle to load, from the next level memory 230, the respective invalidated and/or evicted data relating to one or more of the instructions loaded in the pipeline 210 thus making the respective data available in the cache 222 during a demand access dispatched for the respective instruction.

As such, the data relating to practically any instruction loaded in the pipeline 210 may be available in the cache 222 during the demanded access of any of the loaded instructions regardless of their location (order) in the pipeline 210 such that even when an instruction is executed out-of-order its related data is available in the cache 222 during its demand access.

Figure 3A:
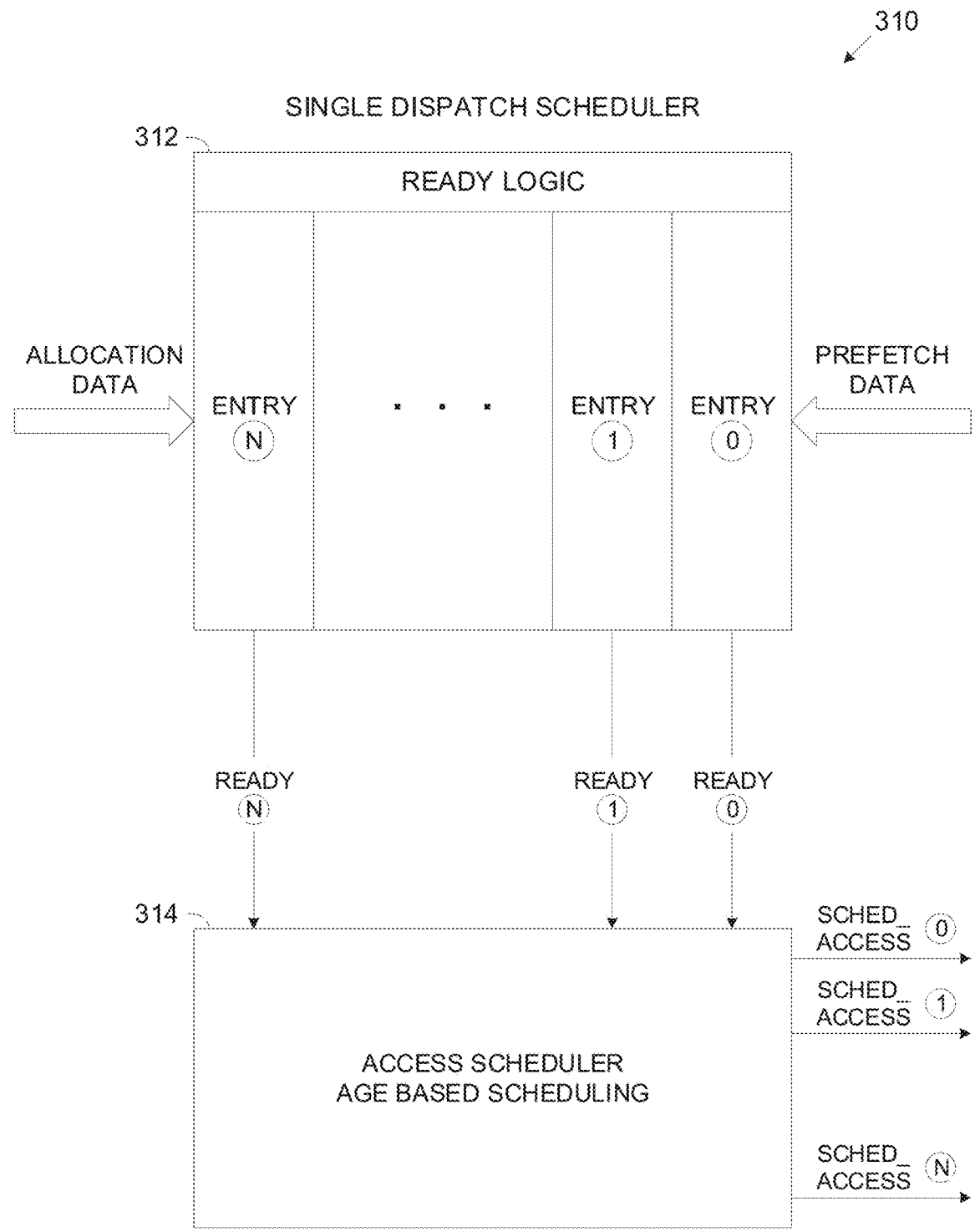
FIG. 3A and FIG. 3B are schematic illustrations of an exemplary scheduler of a processing unit configured for scheduling memory accesses.
Figure 3B:
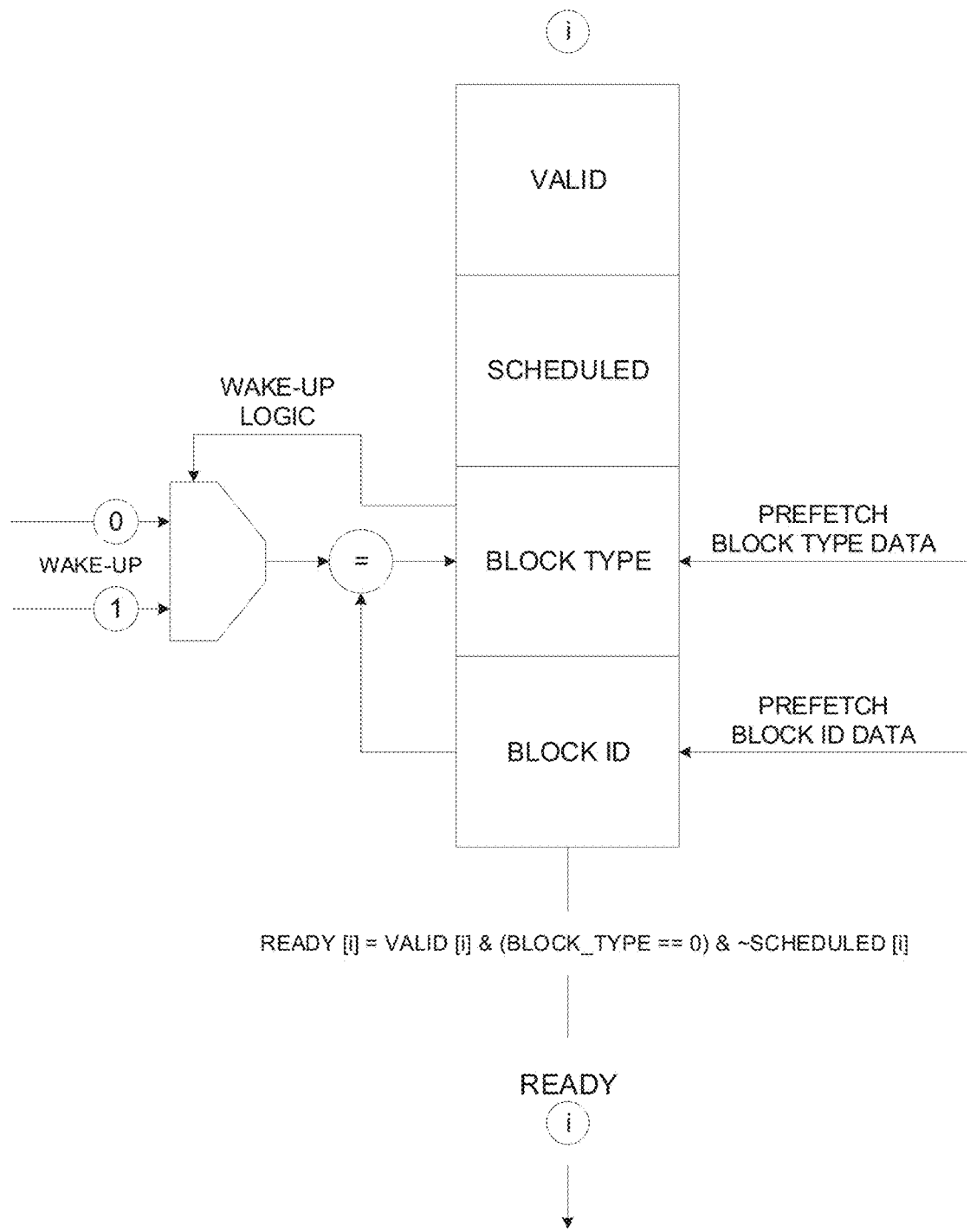

Reference is now made to FIG. 3A and FIG. 3B, which are schematic illustrations of an exemplary scheduler of a processing unit configured for scheduling memory accesses, specifically scheduling memory accesses as known in the art.

As seen in FIG. 3A, a single dispatch scheduler 310 as known in the art may be adapted to dispatch a plurality of memory accesses for accessing data relating to one or more instructions loaded in an execution pipeline such as the execution pipeline 210.

In particular, the single dispatch scheduler 310 may dispatch a plurality of memory accesses regardless of whether they are prefetch accesses or demand accesses provided that they are not blocked, i.e., they are ready for dispatch.

Each new instruction allocated to the single dispatch scheduler 310 may have its own blocking/ready conditions (some may be common). The instructions that are "ready to be dispatched" to one or more ports may be scheduled for dispatch.

The single dispatch scheduler 310 may therefore comprise a ready logic 312 implemented using one or more circuits, components, and/or elements, which is adapted to determine whether each memory access is ready or blocked.

The single dispatch scheduler 310 may also include an access scheduler 314 employing one or more scheduling algorithms, for example, age based scheduling, location based scheduling, and/or the like for dispatching, via one or more dispatch ports, one or more memory accesses which are not subject to any blocking condition and are therefore ready for dispatch.

As seen in FIG. 3B, the ready logic 312 may be implemented, as known in the art, by monitoring blocking conditions separately for each memory access regardless of whether it is a prefetch access or a demand access and generate a ready indication (e.g., flag) accordingly.

Figure 4A:
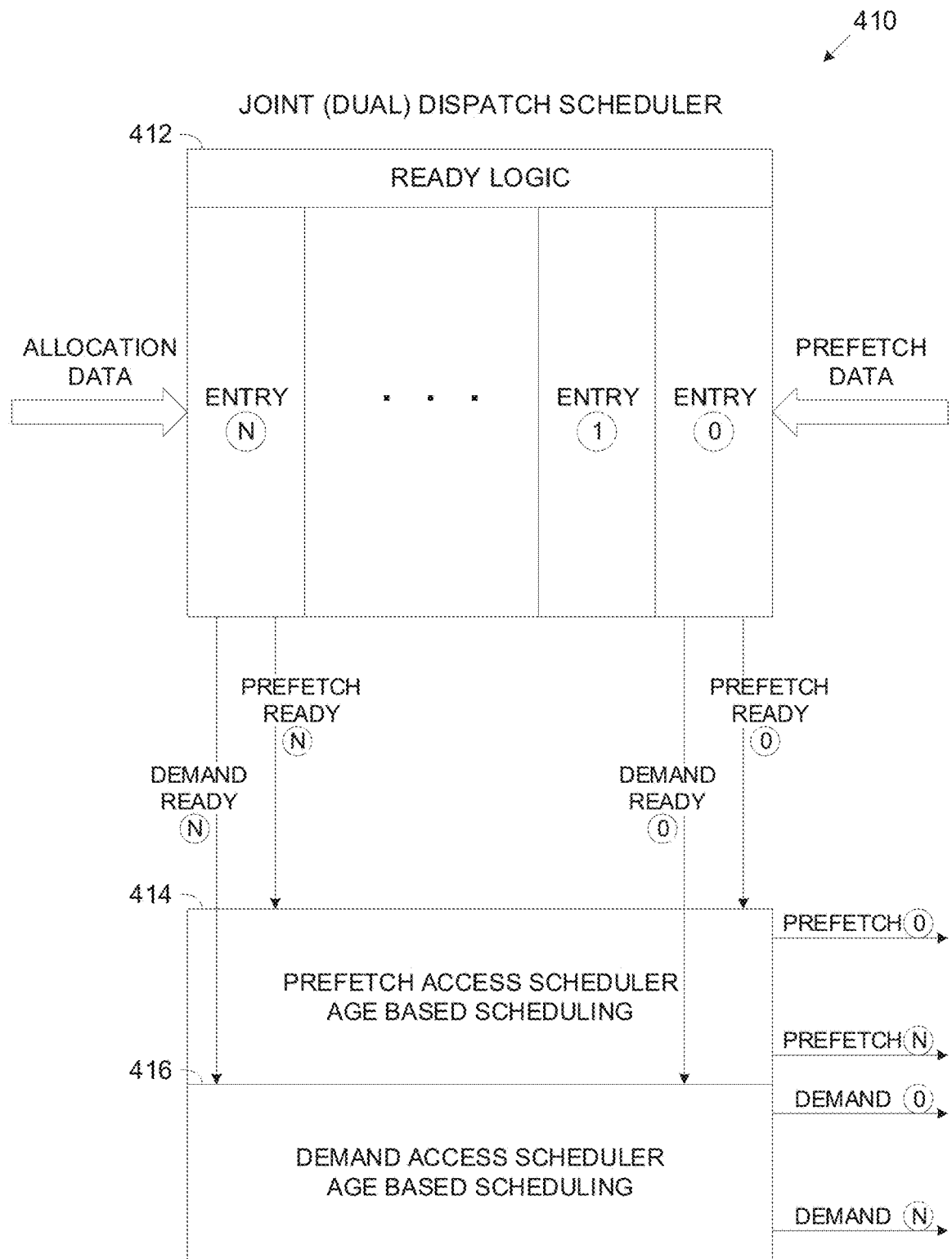
FIG. 4A and FIG. 4B are schematic illustrations of an exemplary joint scheduler of a processing unit configured for efficiently scheduling memory accesses, according to some embodiments of the present invention.
Figure 4B:
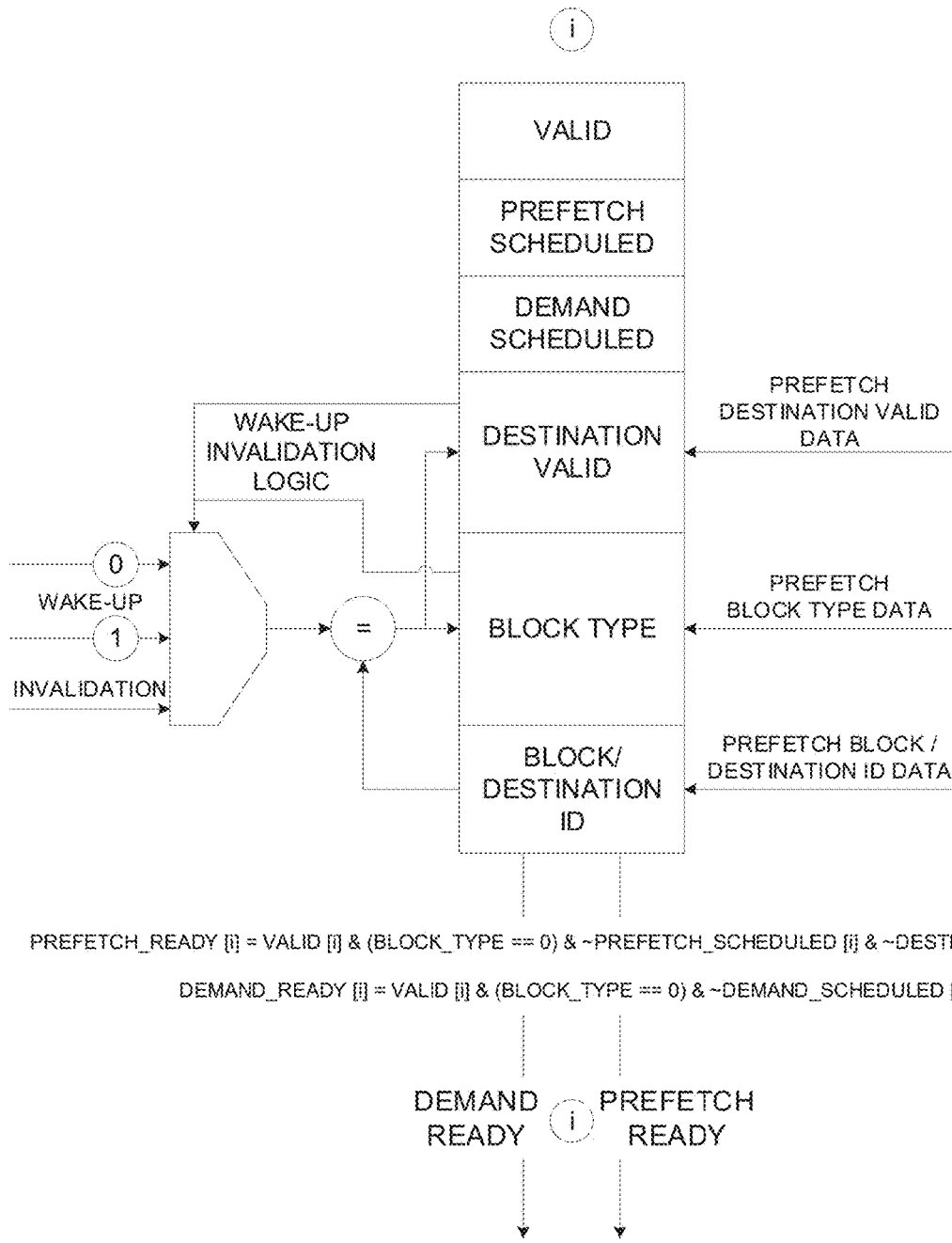

Reference is now made to FIG. 4A and FIG. 4B, which are schematic illustrations of an exemplary joint scheduler of a processing unit configured for efficiently scheduling memory accesses, according to some embodiments of the present invention.

As seen in FIG. 4A, a joint (dual) dispatch scheduler 410 such as the joint scheduler 200 may be adapted to dispatch one or more prefetch accesses and one or more demand accesses for accessing data relating to one or more instructions loaded in an execution pipeline such as the execution pipeline 210.

In particular, the dual dispatch scheduler 410 may dispatch one or more prefetch accesses and one or more demand accesses each scheduled via one or more respective dispatch ports, meaning that prefetch accesses and demand accesses are treated differently from each other.

The dual dispatch scheduler 410 may comprise a ready logic 412 implemented using one or more circuits, components, and/or elements, which is adapted to determine the blocking/ready conditions separately for the prefetch access and for the demand access relating to each instruction (entry) loaded in the execution pipeline 210 and allocated for scheduling by the dual dispatch scheduler 410.

This means that the ready logic 412 may correlate between the prefetch access and the demand access relating to each instruction but may determine the block/ready condition(s) separately for each of the accesses.

The dual dispatch scheduler 410 may include a first scheduler, namely a prefetch access scheduler 414 employing one or more scheduling algorithms, for example, age based scheduling, location based scheduling, and/or the like for dispatching, via one or more dispatch ports, one or more prefetch accesses which are not subject to any blocking condition and are therefore ready for dispatch.

The dual dispatch scheduler 410 may further include a second scheduler, namely a demand access scheduler 414 employing one or more scheduling algorithms, for example, age based scheduling, location based scheduling, and/or the like for dispatching, via one or more dispatch ports, one or more demand accesses which are not subject to any blocking condition and are therefore ready for dispatch.

As seen in FIG. 4B, the ready logic 412 may monitor blocking conditions separately for the prefetch access and the demand access relating to the same instruction and generate a respective ready indication (e.g., flag) accordingly. As such, responsive to determining that a certain prefetch access relating to a certain instruction is ready for dispatch, the ready logic 412 may issue a prefetch ready indication. Similarly, responsive to determining that a certain demand access relating to the certain instruction is ready for dispatch, the ready logic 412 may issue a demand ready indication.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms processor architecture, cache architecture, and scheduling algorithm are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A joint scheduler, comprising:
   a joint scheduler circuit adapted for dispatching prefetch and demand accesses of data relating to a plurality of instructions loaded in an execution pipeline of at least one processing circuit, each prefetch access comprises checking whether a respective data is cached in one of a plurality of cache entries of at least one cache, each demand access comprises accessing a respective data;
   the joint scheduler circuit is adapted to:
   responsive to each hit prefetch access dispatched for a respective data relating to a respective one of the plurality of instructions, associate the respective instruction with a valid indication and a pointer to a respective cache entry storing the respective data such that the demand access relating to the respective instruction uses the associated pointer to access the respective data in the at least one cache, and
   responsive to each missed prefetch access dispatched for a respective data relating to a respective one of the plurality of instructions, initiate a read cycle for loading the respective data from next level memory and cache it in the at least one cache.

2. The joint scheduler of claim 1, wherein the joint scheduler circuit is adapted to, responsive to successful completion of a respective read cycle initiated for loading a respective data from the next level memory and caching it in the at least one cache following a respective missed prefetch access, associate the respective instruction with the valid indication and the pointer to the respective cache entry storing the cached respective data.

3. The joint scheduler of claim 1, wherein the joint scheduler circuit is adapted to, responsive to successful completion of a respective read cycle initiated for loading a respective data from the next level memory and caching it in the at least one cache following a respective missed prefetch access, dispatch another prefetch access to update the valid indication and the pointer to the respective cache entry storing the cached respective data.

4. The joint scheduler of claim 1, wherein the joint scheduler circuit is further adapted to track invalidation and/or eviction of data stored in each of the plurality of cache entries and, responsive to eviction of a respective cache entry storing a respective data relating to a respective one of the plurality of instructions, associate the respective instruction with an invalid indication and initiate another prefetch cycle to load the respective data from the next level memory into the at least one cache.

5. The joint scheduler of claim 1, wherein the joint scheduler circuit is further adapted to mark a respective cache entry with an active indication for each prefetch access hit, the active indication indicates that the respective cache entry is mapped by a pointer associated with at least one of the instructions, the active indication is used by the joint scheduler circuit for tracking invalidation and/or eviction of data stored in the respective cache entry.

6. The joint scheduler of claim 1, wherein the joint scheduler circuit is adapted to, for each prefetch access miss, associate the respective instruction with a block mark indicating that each prefetch access and/or demand access relating to the respective instruction is blocked for dispatch.

7. The joint scheduler of claim 6, wherein the joint scheduler circuit is adapted to, responsive to successful completion of the prefetch cycle, remove the block mark associated with the respective instruction.

8. The joint scheduler of claim 1, wherein the joint scheduler circuit comprises at least one prefetch port for dispatching the prefetch accesses and at least one demand port for dispatching the demand accesses, the at least one prefetch port is separate and independent of the at least one demand port.

9. The joint scheduler of claim 8, wherein at least one prefetch access and at least one demand access are dispatched simultaneously via the independent at least one prefetch port and the at least one demand port respectively.

10. The joint scheduler of claim 9, wherein for at least one simultaneously dispatched prefetch access and at least one demand access relating to a common cache entry, responsive to completion of the at least one prefetch access, a pointer to the common cache entry is updated for the at least one demand access directly in the at least one demand port.

11. A method of jointly scheduling prefetch and demand accesses, comprising:
using a joint scheduler circuit adapted for dispatching prefetch and demand accesses of data relating to a plurality of instructions loaded in an execution pipeline of at least one processing circuit, each prefetch access comprises checking whether a respective data is cached in one of a plurality of cache entries of at least one cache, each demand access comprises accessing a respective data;
the joint scheduler circuit is adapted to:
responsive to each hit prefetch access dispatched for a respective data relating to a respective one of the plurality of instructions, associate the respective instruction with a valid indication and a pointer to a respective cache entry storing the respective data such that the demand access relating to the respective instruction uses the associated pointer to access the respective data in the at least one cache, and
responsive to each missed prefetch access dispatched for a respective data relating to a respective one of the plurality of instructions, initiate a read cycle for loading the respective data from next level memory and cache it in the at least one cache.

12. The method of claim 11, wherein the joint scheduler circuit is adapted to, responsive to successful completion of a respective read cycle initiated for loading a respective data from the next level memory and caching it in the at least one cache following a respective missed prefetch access, associate the respective instruction with the valid indication and the pointer to the respective cache entry storing the cached respective data.

13. The method of claim 11, wherein the joint scheduler circuit is adapted to, responsive to successful completion of a respective read cycle initiated for loading a respective data from the next level memory and caching it in the at least one cache following a respective missed prefetch access, invoke another prefetch access to update the valid indication and the pointer to the respective cache entry storing the cached respective data.

14. The method of claim 11, wherein the joint scheduler circuit is further adapted to track invalidation and/or eviction of data stored in each of the plurality of cache entries and, responsive to eviction of a respective cache entry storing a respective data relating to a respective one of the plurality of instructions, associate the respective instruction with an invalid indication and initiate another prefetch cycle to load the respective data from the next level memory into the at least one cache.

15. The method of claim 11, wherein the joint scheduler circuit is further adapted to mark a respective cache entry with an active indication for each prefetch access hit, the active indication indicates that the respective cache entry is mapped by a pointer associated with at least one of the instructions, the active indication is used by the joint scheduler circuit for tracking invalidation and/or eviction of data stored in the respective cache entry.

16. The method of claim 11, wherein the joint scheduler circuit is adapted to, for each prefetch access miss, associate the respective instruction with a block mark indicating that each prefetch access and/or demand access relating to the respective instruction is blocked for dispatch.

17. The method of claim 16, wherein the joint scheduler circuit is adapted to, responsive to successful completion of the prefetch cycle, remove the block mark associated with the respective instruction.

18. A joint scheduler, comprising:
a joint scheduler circuit adapted for enhancing out-of-order execution of a plurality of instructions loaded in an execution pipeline of at least one processing circuit by:
tracking invalidation and/or eviction of data stored in each of a plurality of cache entries of at least one cache storing data relating to the plurality of instructions, and
dispatching a prefetch cycle to load the invalidated and/or evicted data relating to at least one of the plurality of instructions thus making the respective data available in the at least one cache during a demand access dispatched for the at least one instruction.

19. The joint scheduler of claim 18, wherein the joint scheduler is adapted to dispatch the prefetch cycle responsive to eviction and/or invalidation of at least one cache entry storing respective data relating to a respective one of the plurality of instructions by:
initiating the prefetch cycle to load the respective data from a next level memory into the at least one cache, and
associating the respective instruction with a valid indication and a pointer to a respective cache entry storing the respective data such that the demand access relating to the respective instruction uses the associated pointer to access the respective data in the at least one cache.

20. The joint scheduler of claim 19, wherein the joint scheduler circuit is further adapted to associate the respective instruction with the valid indication and the pointer by initiating another prefetch cycle for the respective instruction,
wherein the joint scheduler circuit is adapted to associate the respective instruction with the valid indication and the pointer responsive to a hit of the another prefetch cycle.

* * * * *